United States Patent Office 3,210,361
Patented Oct. 5, 1965

3,210,361
CYCLOHEXANE DERIVATIVES AND THEIR PREPARATION
Leslie G. Humber, Montreal, Quebec, Canada, assignor to American Home Products Corporation, New York, N.Y., a corporation of Delaware
No Drawing. Filed Sept. 6, 1962, Ser. No. 221,871
10 Claims. (Cl. 260—296)

This invention relates to novel chemical compounds, certain new derivatives of cyclohexane, and to the process utilized in their preparation.

More particularly, my invention relates to new hetero-aromatic-substituted derivatives of cyclohexane, which new chemical compounds possess valuable pharmacological properties.

The new chemical compounds, in base form, may be generically represented by the formula:

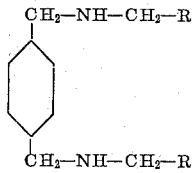

wherein R represents a heterocyclic aromatic group such as, for example, a pyridyl group, a thienyl group, or a furyl group. The heterocyclic aromatic groups may be attached to the rest of the molecule as represented by the structural formula in any one of a number of positions relative to the hetero atom which they contain, among these, the 2- and 4-positions being preferred.

The novel chemical compounds possessing interesting biological activities, in base form, are thus 1,4-bis[(aromatic heterocyclyl)methylaminomethyl]cyclohexanes. These compounds, being basic in nature, form tertiary acid addition salts. Such acid addition salts with pharmacologically acceptable acids are biologically equivalent to the free bases, and consititute a preferred form for the administration of the compounds of my invention.

The new chemical compounds forming the subject of this invention are useful both as antibacterial agents and as agents for lowering cholesterol levels in the blood. For example, they will lower cholesterol blood levels in the intact rat by highly significant degrees when administered orally in small doses. They are also effective as antibacterial agents, against both gram positive and gram negative organisms.

Data respecting these activities of individual chemical compounds within the scope of my invention, as defined by the generic formula given above, will be found subsequently in this disclosure.

My preferred procedure for preparing the new chemical compounds may be described as follows.

A suitable heterocyclic aromatic aldehyde is caused to react with 1,4-bis-aminomethyl cyclohexane by bringing the two reactants together at an elevated temperature, such as at the temperature of reflux. The reaction is advantageously carried out in a suitable solvent, preferably in benzene. This results in condensation to form the corresponding Schiff base, with elimination of two moles of water.

The resulting Schiff base is then reduced to the corresponding amino compound, the reduction being preferably carried out with sodium borohydride in methanolic solution as the reducing agent. The free base is then recovered, preferably by evaporation off of the solvent, yielding an oily product. If a pharmacologically equivalent acid addition salt of the base is desired, this may be prepared by treating the base in the conventional manner with the acid. The acid selected will of course be a pharmaceutically acceptable acid, such as one of the hydrohalic acids or other known acids falling within this category, such as sulfuric acid.

This process may be indicated schematically as follows:

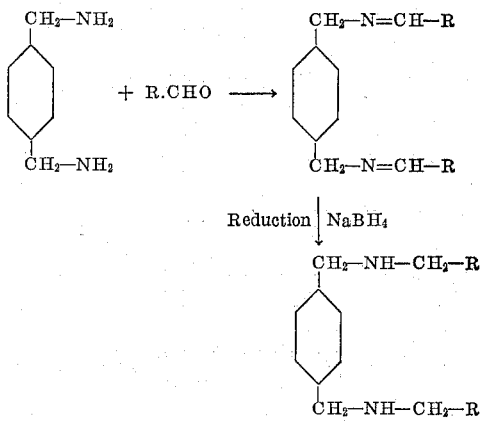

wherein R represents a heterocyclic aromatic group such as, for example, a pyridyl, thienyl or furyl group. Details of this process as applied to the preparation of specific chemical compounds within the scope of my invention are given below.

When utilized as agents for lowering the cholesterol level in the blood, the following values illustrate the extent of such lowering at various dose levels.

TABLE A

| Compound | Dose Level, micromoles/ kg. orally | Lowering of Cholesterol Levels, percent |
| --- | --- | --- |
| I | 25 | 18 |
| III | 75 | 27 |
| IV | 10 | 8.5 |

In this table:
Compound I is 1,4-bis(2-pyridylmethylaminomethyl)-cyclohexane.
Compound III is 1,4-bis(2-thienylmethylaminomethyl)-cyclohexane.
Compound IV is 1,4-bis(furfurylaminomethyl) - cyclohexane.

As illustrative of the activity of the componuds as antibacterial agents, certain of the compounds were effective against the specified microorganisms at the dilutions state in the following table.

TABLE B.—ANTIBACTERIAL ACTIVITY (L./MIC)

| Organism | Compound III | Compound IV |
| --- | --- | --- |
| Staph. pyogenes S.[1] | >1,000 | 10,000 |
| Staph. pyogenes R.[2] | >1,000 | 10,000 |
| Sarcina lutea | 2,000 | 10,000 |
| Strep. faecalis | | 10,000 |
| E. coli 198 | 1,000 | 10,000 |
| A. aerogenes | | 10,000 |
| S. pullorum | | 10,000 |
| Ps. aeruginosa | | 10,000 |
| Pr. mirabilis | 1,000 | 10,000 |
| Pr. vulgaris | | 10,000 |

[1] Penicillin-sensitive strain.
[2] Penicillin-resistant strain.

Compound III as referred to in Table B is the compound: 1,4-bis (2-thienylmethylaminomethyl)-cyclohexane. Compound IV is the compound: 1,4-bis(furfurylaminomethyl)-cyclohexane.

The following examples are illustrative of my invention.

Example 1.—1,4-bis(2-pyridylmethylaminomethyl)-cyclohexane 2-pyridylcarboxaldehyde (21.4 g., 0.2 mole) and 1,4-bisaminomethylcyclohexane (0.1 mole) were converted to the Schiff base in benzene. The product was an oil and had a strong band in the infrared at 1651 cm.$^{-1}$. It was reduced with sodium borohydride (7.6 g.) and worked up to yield the title compound, 1,4-bis(2-pyridylmethylaminomethyl)-cyclohexane, as an oil; λ max. 261 mμ ($\epsilon$=5,790).

The disulphate salt was prepared by adding an ethereal solution of the title compound to an ether solution of the theoretical quantity of sulphuric acid. The salt precipitated and was crystallized from a methanol-water mixture. It was obtained as a sesquihydrate and had a melting point of 222–223° C.

Analysis confirmed the empiric formula:

$$C_{20}H_{32}N_4S_2O_8 \cdot 1 \cdot 5H_2O$$

for the disulphate salt of 1,4-bis(2-pyridylmethylaminomethyl)-cyclohexane.

Example 2.—1,4-bis(4-pyridylmethylaminomethyl)-cyclohexane 4-pyridinecarboxaldehyde (21.4 g) and 1,4-bisaminomethylcyclohexane (14.2 g.) were converted to the Schiff base by refluxing in benzene. Reduction with sodium borohydride (7.6 g.) in methanol yielded the title compound, 1,4-bis(4-pyridylmethylaminomethyl)-cyclohexane. It boiled at 250°/0.4 mm.

A disulphate salt of the base was prepared in the usual manner and crystallized from a water-ethanol mixture. It had a melting point of 257–258° C. (d.).

Analysis confirmed the empiric formula: $C_{20}H_{32}N_4S_2O_8$ for the disulphate salt of 1,4-bis(4-pyridylmethylaminomethyl)-cyclohexane.

Example 3.—1,4-bis(2-thienylmethylaminomethyl)-cyclohexane

2 - thienylcarboxaldehyde (25 g.) and 1,4 - bisaminomethylcyclohexane (17.0 g.) were refluxed in benzene until the theoretical quantity of water had been removed azeotropically. The resulting Schiff base had λ max. 245 mμ ($\epsilon$=23,100), 263 mμ ($\epsilon$=25,300) and 284 mμ ($\epsilon$=24,150). It was dissolved in methanol and reduced with sodium borohydride (20.4 g.) to yield the title compound, 1,4 - bis(2-thienylmethylaminomethyl)-cyclohexane, as an oil: λ max. 234 mμ ($\epsilon$=15,850).

The dihydrochloride salt of the base was prepared by treatment with ethereal hydrogen chloride. It crystallized from hot methanol and had a melting point in excess of 360° C.

Analysis confirmed the empiric formula $C_{18}H_{28}Cl_2N_2S_2$; for the dihydrochloride of 1,4-bis(2-thienylmethylaminomethyl)-cyclohexane.

Example 4.—1,4-bis(furfurylaminomethyl)-cyclohexane

Freshly distilled furfural (19.2 gm., 0.2 mole) and 1,4-bisaminomethylcyclohexane (0.1 mole) were converted to the corresponding Schiff base by refluxing in benzene. The product was a dark oil. It was dissolved in methanol and reduced with sodium borohydride (4.5 gm.) to yield the title compound, 1,4-bis(furfurylaminomethyl)-cyclohexane, as an oil. It had λmax.; 271 mμ ($\epsilon$=217).

A dihydrochloride salt of the base was prepared by treatment with ethereal hydrogen chloride. It crystallized from a methanol-ether mixture and melted at 264° C. (d.).

Analysis confirmed the empiric formula $C_{18}H_{28}O_2N_2Cl_2$, for the dihydrochloride salt of 1,4-bis(furfurylaminomethyl)-cyclohexane.

I claim:

1. A compound selected from the group which consists of compounds of the formula

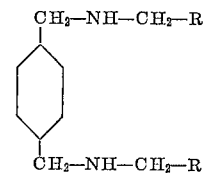

wherein R is a group selected from the class consisting of 2-pyridyl, 4-pyridyl, 2-thienyl and furyl, and acid addition salts of said compounds with pharmaceutically acceptable acids.

2. A compounds of the formula

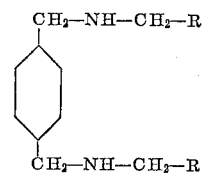

wherein R is a group selected from the class consisting of 2-pyridyl, 4-pyridyl, 2-thienyl and furyl.

3. 1,4 - bis(2-pyridylmethylaminomethyl)-cyclohexane.
4. 1,4 - bis(4-pyridylmethylaminomethyl)-cyclohexane.
5. 1,4 - bis(2-thienylmethylaminomethyl)-cyclohexane.
6. 1,4-bis(furfurylaminomethyl)-cyclohexane.
7. The disulphate salt of 1,4-bis(2-pyridylmethylaminomethyl)-cyclohexane.
8. The disulphate salt of 1,4-bis(4-pyridylmethylaminomethyl)-cyclohexane.
9. The dihydrochloride salt of 1,4-bis(2-thienylmethylaminomethyl)-cyclohexane.
10. The dihydrochloride salt of 1,4-bis(furfurylaminomethyl)-cyclohexane.

No references cited.

WALTER A. MODANCE, *Primary Examiner.*
NICHOLAS S. RIZZO, *Examiner.*